(12) United States Patent
He et al.

(10) Patent No.: US 12,484,121 B2
(45) Date of Patent: Nov. 25, 2025

(54) LIGHTING CIRCUIT AND CONTROL METHOD THEREOF

(71) Applicant: Joulwatt Technology Co., Ltd., Hangzhou (CN)

(72) Inventors: Wanyue He, Hangzhou (CN); Guoqiang Liu, Hangzhou (CN)

(73) Assignee: Joulwatt Technology Co., Ltd., Hangzhou (CN)

( * ) Notice: Subject to any disclaimer, the term of this patent is extended or adjusted under 35 U.S.C. 154(b) by 28 days.

(21) Appl. No.: 18/782,097

(22) Filed: Jul. 24, 2024

(65) Prior Publication Data

US 2025/0126689 A1 Apr. 17, 2025

(30) Foreign Application Priority Data

Oct. 17, 2023 (CN) .......................... 202311349780.6

(51) Int. Cl.
*H05B 45/10* (2020.01)
*H05B 45/3575* (2020.01)
*H05B 45/37* (2020.01)
*H05B 45/44* (2020.01)

(52) U.S. Cl.
CPC ......... *H05B 45/10* (2020.01); *H05B 45/3575* (2020.01); *H05B 45/37* (2020.01); *H05B 45/44* (2020.01)

(58) Field of Classification Search
CPC ........ H05B 45/10; H05B 45/44; H05B 45/37; H05B 45/3575
See application file for complete search history.

(56) References Cited

U.S. PATENT DOCUMENTS

| | | | | |
|---|---|---|---|---|
| 10,512,131 | B2 * | 12/2019 | Zhu | H05B 45/10 |
| 10,887,957 | B2 * | 1/2021 | Chen | H05B 47/10 |
| 10,912,169 | B2 * | 2/2021 | Mun | H05B 45/48 |
| 11,259,382 | B2 * | 2/2022 | Yu | H05B 41/38 |
| 11,297,704 | B2 * | 4/2022 | Zhu | H05B 45/14 |
| 11,382,196 | B2 * | 7/2022 | Sun | H05B 45/30 |
| 11,405,992 | B2 * | 8/2022 | Li | H05B 45/31 |
| 11,540,371 | B2 * | 12/2022 | Zhu | H05B 45/14 |

(Continued)

FOREIGN PATENT DOCUMENTS

| | | | | | |
|---|---|---|---|---|---|
| CN | 107995750 | A | * | 5/2018 | ......... H05B 45/3575 |
| CN | 109275230 | A | * | 1/2019 | ......... H05B 45/3575 |

(Continued)

*Primary Examiner* — Adam D Houston
(74) *Attorney, Agent, or Firm* — Bayramoglu Law Offices

(57) ABSTRACT

A lighting circuit and a control method thereof are provided. The lighting circuit includes a triac dimmer connected between an alternating current (AC) input power supply and a rectifier circuit, where the rectifier circuit is configured to output a bus voltage after phase cutting, and further includes a turn-on angle detection circuit configured to detect a turn-on state of the triac dimmer and output a first detection signal that represents a relationship between a turn-on angle of the triac dimmer and a first angle, and a bleeder circuit connected to the rectifier circuit and configured to control turn-off time of the bleeder circuit based on the first detection signal and a sampling signal representing a current of a light-emitting diode (LED) load.

15 Claims, 3 Drawing Sheets

(56) References Cited

U.S. PATENT DOCUMENTS

| | | | | |
|---|---|---|---|---|
| 2008/0224633 | A1* | 9/2008 | Melanson | H05B 45/14 |
| | | | | 315/292 |
| 2011/0068706 | A1* | 3/2011 | Otake | H05B 45/3725 |
| | | | | 315/291 |
| 2011/0291583 | A1* | 12/2011 | Shen | H05B 47/185 |
| | | | | 315/287 |
| 2012/0249000 | A1* | 10/2012 | Kawai | H05B 45/10 |
| | | | | 315/200 R |
| 2012/0319610 | A1* | 12/2012 | Yoshinaga | H05B 45/3575 |
| | | | | 315/210 |
| 2019/0124736 | A1* | 4/2019 | Zhu | H03K 5/24 |
| 2019/0150240 | A1* | 5/2019 | Yu | H05B 45/31 |
| | | | | 315/200 R |
| 2019/0297715 | A1* | 9/2019 | Fu | H05B 45/10 |
| 2019/0364628 | A1* | 11/2019 | Chen | H05B 45/31 |
| 2020/0113026 | A1* | 4/2020 | Chen | H05B 45/3725 |
| 2020/0146121 | A1* | 5/2020 | Zhu | H05B 45/3575 |
| 2020/0205263 | A1* | 6/2020 | Zhu | H05B 45/395 |
| 2021/0321501 | A1* | 10/2021 | Zhu | H05B 45/355 |
| 2021/0410245 | A1* | 12/2021 | Li | H05B 45/3575 |
| 2022/0095426 | A1* | 3/2022 | Lo | H05B 45/59 |
| 2023/0095301 | A1* | 3/2023 | He | H05B 45/345 |
| | | | | 315/185 R |
| 2023/0180364 | A1* | 6/2023 | Zhu | H05B 45/14 |
| | | | | 315/291 |
| 2024/0147591 | A1* | 5/2024 | Zhu | H05B 45/14 |
| 2025/0126689 | A1* | 4/2025 | He | H05B 45/10 |

FOREIGN PATENT DOCUMENTS

| | | | | |
|---|---|---|---|---|
| CN | 107995747 B | * | 11/2019 | H05B 45/10 |
| CN | 117729660 A | * | 3/2024 | H05B 45/31 |
| EP | 3576496 A1 | * | 12/2019 | H05B 39/044 |
| EP | 3644691 A1 | * | 4/2020 | H05B 45/3575 |

\* cited by examiner

LIGHTING CIRCUIT AND CONTROL METHOD THEREOF

CROSS-REFERENCE TO THE RELATED APPLICATIONS

This application is based upon and claims priority to Chinese Patent Application No. 202311349780.6, filed on Oct. 17, 2023, the entire contents of which are incorporated herein by reference.

TECHNICAL FIELD

The present disclosure relates to the field of lighting, and in particular, to a lighting circuit and a control method thereof.

BACKGROUND

A triac dimmer is currently a frequently-used dimming method. A triac dimmer (also known as a triode for alternating current (TRIAC)) is connected in series between an AC input power supply and a rectifier circuit, and achieves dimming by using a phase control method. That is, the triac dimmer is controlled to turn on in each half cycle of a sine wave to obtain a same turn-on angle. A size of the turn-on angle can be changed by adjusting a chopping phase of the triac dimmer, to achieve the dimming. In order to keep the triac dimmer on, a certain holding current is required for the triac dimmer.

In the prior art, if a turn-on angle of the triac dimmer is not distinguished, in order to keep the triac dimmer on when the turn-on angle is large, it is required to continuously generate a bleed-off current before generating a current of a light-emitting diode (LED) load. When the turn-on angle of the triac dimmer is less than 90 degrees, as shown in FIG. 1, if the current of the LED load is not detected after the triac dimmer is turned on, it indicates that a bus voltage VBUS is less than a voltage drop VF of the LED load. As the bus voltage VBUS further decreases, the bus voltage is always less than the voltage drop of the LED load. As a result, the LED load is no longer turned on, and the current of the LED load is no longer detected. Therefore, a bleeder circuit will be always on to generate the bleed-off current all of the time to keep the triac dimmer on, and generating the bleed-off current all of the time will cause a significant loss and reduce system output efficiency.

SUMMARY

An objective of the present disclosure is to provide an efficient lighting circuit and a control method thereof, which solve a problem of a significant loss caused by generation of a bleed-off current all the time when a turn-on angle is small in the prior art, and optimize compatibility of a triac dimmer at a small angle.

The present disclosure further provides a lighting circuit, including a triac dimmer and a rectifier circuit, where the triac dimmer is connected between an AC input power supply and the rectifier circuit, the rectifier circuit is configured to output a bus voltage after phase cutting, and the lighting circuit further includes:
  a turn-on angle detection circuit configured to detect a turn-on state of the triac dimmer, and output a first detection signal; the first detection signal represents a relationship between a turn-on angle of the triac dimmer and a first angle; and
  a bleeder circuit connected to the rectifier circuit and configured to receive a sampling signal representing a current of a light-emitting diode (LED) load and the first detection signal, and control a turn-on state of the bleeder circuit based on the first detection signal and the sampling signal; where
  when the first detection signal represents that the turn-on angle is less than or equal to the first angle, and turn-on time of the triac dimmer reaches first time, when the sampling signal is greater than or equal to a first threshold, the bleeder circuit keeps on; or when the sampling signal is less than the first threshold, the bleeder circuit is turned off.

Optionally, when the first detection signal represents that the turn-on angle is greater than the first angle,
  before the LED load is turned on and during turn-on of the LED load, the bleeder circuit keeps on, and the bleeder circuit is turned off when the sampling signal drops to the first threshold.

Optionally, the turn-on angle detection circuit is configured to detect the bus voltage, where
  when the detected bus voltage increases within specified time, the first detection signal represents that the turn-on angle is greater than the first angle; or
  when the detected bus voltage decreases within the specified time, the first detection signal represents that the turn-on angle is less than or equal to the first angle.

Optionally, the first angle is set to be equal to or close to 90°.

Optionally, the first time is set to be time greater than 0.

Optionally, when the bus voltage is less than a second threshold, the bleeder circuit is turned on.

Optionally, when the bus voltage is less than a second threshold, the bleeder circuit is turned on after delaying second time.

Optionally, the turn-on angle detection circuit includes:
  a turn-on detection circuit connected to the bus and configured to output a signal representing that the triac dimmer is turned on;
  a voltage detection circuit connected to the turn-on detection circuit and configured to detect the bus voltage to obtain a voltage detection signal after the triac dimmer is turned on;
  a sampling holder configured to: after turn-on time of the triac dimmer reaches third time, sample and hold the voltage detection signal, and output a voltage holding signal; and
  a first comparator configured to: after turn-on time of the triac dimmer reaches the fourth time, compare the voltage detection signal and the voltage holding signal, and output a first comparison signal, where when the voltage detection signal is greater than the voltage holding signal, the first comparison signal represents that the turn-on angle is greater than the first angle; or when the voltage detection signal is less than the voltage holding signal, the first comparison signal represents that the turn-on angle is less than or equal to the first angle.

Optionally, the turn-on detection circuit includes a first capacitor, a first resistor, and a second comparator;
  the first capacitor and the first resistor are connected in series to form a series circuit, where a first terminal of the series circuit is configured to receive the bus voltage, and a second terminal of the series circuit is grounded; and
  a first input terminal connected to a common connection terminal of the first capacitor and the first resistor, and a second input terminal configured to receive a reference voltage, where when a voltage of the common connection terminal of the first capacitor and the first resistor is greater than or equal to the reference voltage, the second comparator outputs a second comparison signal representing that the triac dimmer is turned on.

Optionally, the bleeder circuit includes a first switching transistor and a bleeder resistor that are connected in series to form a series circuit which is in parallel connection with the rectifier circuit, where when the first switching transistor is turned on, the bleeder circuit is turned on.

Optionally, the lighting circuit further includes a LED control circuit connected to the LED load and configured to control a working state of the LED load.

The present disclosure further provides a control method of a lighting circuit, where the lighting circuit includes a triac dimmer and a rectifier circuit, the triac dimmer is connected between an AC input power supply and the rectifier circuit, the rectifier circuit is configured to output a bus voltage after phase cutting, and the control method includes:

detecting a turn-on state of the triac dimmer, and obtaining a first detection signal that represents a relationship between a turn-on angle of the triac dimmer and a first angle; and controlling a turn-on state of a bleeder circuit based on the first detection signal and a sampling signal representing a current of an LED load, wherein the bleeder circuit is connected in parallel to an output terminal of the rectifier circuit, where when the first detection signal represents that the turn-on angle is less than or equal to the first angle, and turn-on time of the triac dimmer reaches first time, if the sampling signal is greater than or equal to a first threshold, the bleeder circuit keeps on; or if the sampling signal is less than the first threshold, the bleeder circuit is turned off; or when the first detection signal represents that the turn-on angle is greater than the first angle, before the LED load is turned on and during turn-on of the LED load, the bleeder circuit keeps on, and the bleeder circuit is turned off when the sampling signal drops to the first threshold.

Optionally, the control method includes detecting the bus voltage, and if the detected bus voltage increases within specified time, indicating that the turn-on angle is greater than the first angle; or if the detected bus voltage decreases within the specified time, indicating that the turn-on angle is less than or equal to the first angle.

Optionally, the first angle is set to be equal to or close to 90°.

Optionally, the first time is set to be time greater than 0.

DETAILED DESCRIPTION OF THE EMBODIMENTS

The preferred embodiments of the present disclosure are described in detail below with reference to the accompanying drawings, but the present disclosure is not limited to these embodiments. The present disclosure covers any substitution, modification, equivalent method, and solution made within the spirit and scope of the present disclosure.

For a better understanding of the present disclosure, the specific details of the following preferred embodiments of the present disclosure are explained hereinafter in detail, while the present disclosure can also be fully understood by those skilled in the art without the description of these details.

The following describes the present disclosure in more detail by using examples and with reference to the accompanying drawings. It should be noted that the accompanying drawings are simplified and do not use an accurate proportion, that is, the accompanying drawings are for the objectives of conveniently and clearly assisting in illustrating the embodiments of the present disclosure.

Figure 1:
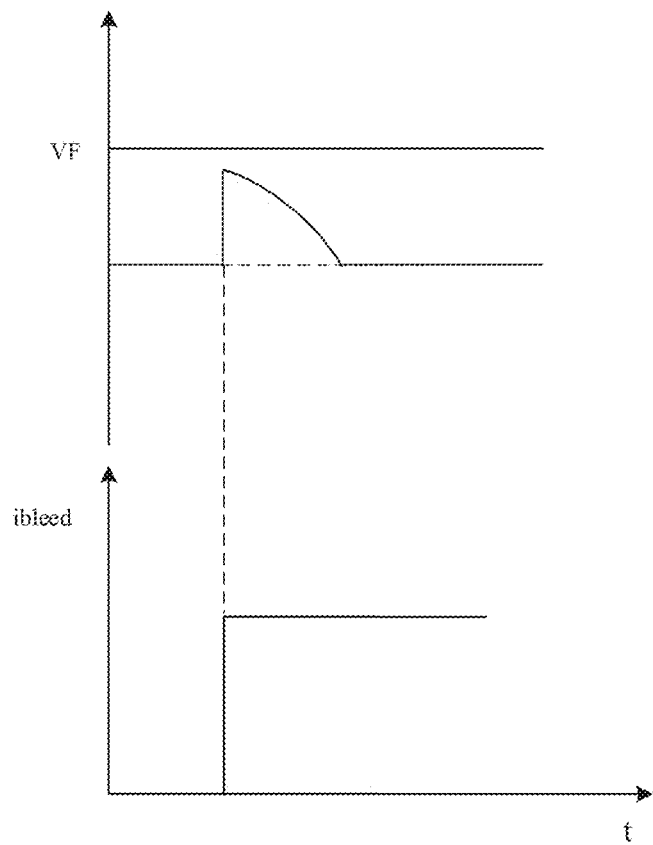
FIG. 1 shows a waveform generated by an existing bleed-off current.
Figure 2:
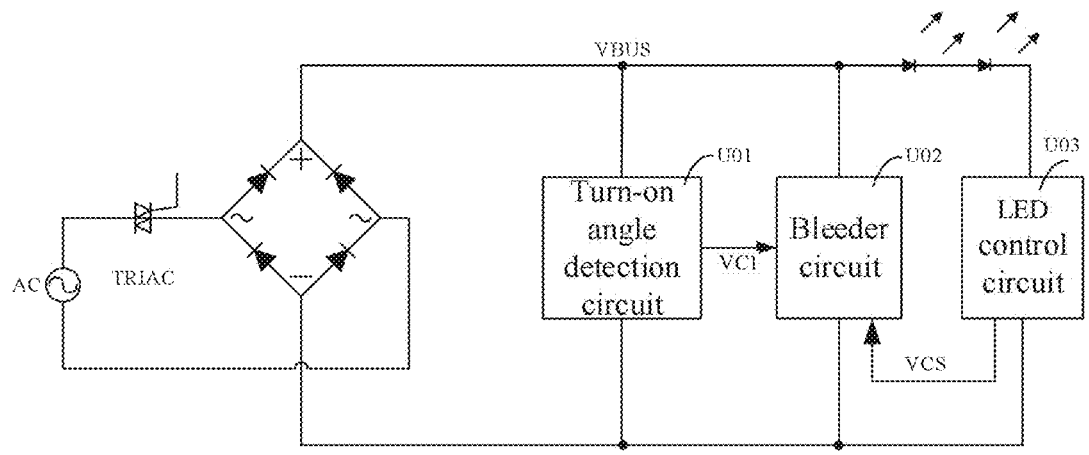
FIG. 2 is a schematic diagram of a lighting circuit according to the present disclosure.

FIG. 2 is a schematic diagram of a lighting circuit according to the present disclosure, including a triac dimmer, a rectifier circuit, turn-on angle detection circuit U01, bleeder circuit U02, and LED control circuit U03. The triac dimmer is connected in series between any input terminal of AC input power supply and the rectifier circuit. The triac dimmer is controlled to turn on in each half cycle of sinusoidal AC input voltage VAC, and a same turn-on angle is obtained. Bus voltage VBUS after phase cutting is obtained after an AC input voltage passes through the triac dimmer and the rectifier circuit. The present disclosure takes power from the bus voltage VBUS to control an LED load and the bleeder circuit U02. Before the triac dimmer is turned on in each half wave cycle, there is no voltage on a bus. Therefore, the lighting circuit in the present disclosure powers down in each half wave cycle, and it is not possible to store detected turn-on angle information of the triac dimmer and detected LED load information all the time. Therefore, the turn-on angle information and a current of the LED load need to be detected in each cycle. The turn-on angle detection circuit U01 is configured to detect a turn-on angle of the triac dimmer to obtain first detection signal VC1 that represents the turn-on angle. In the present disclosure, a first angle is preferably 90 degrees or close to 90 degrees. In an embodiment of the present disclosure, as shown in FIG. 2, the turn-on angle detection circuit U01 is connected in parallel to an output end of the rectifier circuit to output the first detection signal VC1. The bleeder circuit U0 is configured to receive sampling voltage VCS representing the current of the LED load and the first detection signal VC1, and control turn-off time of the bleeder circuit based on the sampling voltage VCS and the first detection signal VC1. It is known that after the triac dimmer is turned on, when the current of the LED load is less than a threshold current that is 0 or close to 0, which generally means that the LED load is not turned on or a turn-on current is too small, to keep the triac dimmer on, the bleeder circuit is continuously on and generates a bleed-off current. A sum of the bleed-off current and the load current reaches a holding current to keep the triac dimmer on. In a frequently-used embodiment, the bleeder circuit includes a series circuit formed by a switching transistor and a resistor that are connected in series. The series circuit is connected in parallel to the output end of the rectifier circuit. Turn-on/off of the bleeder circuit is controlled by controlling turn-on/off of the switching transistor. In a state in which the switching transistor is turned on, the bleed-off current is generated when the triac dimmer is turned on, and flows through the switching transistor and the resistor that are connected in series. The LED control circuit U03 is connected between a negative terminal of the LED load and a low-potential output end of the rectifier circuit and configured to control a working state of the LED load. The LED control circuit U03 herein may be a switching converter, a linear circuit, or another frequently-used circuit, and for example, can be configured to remove a ripple, stabilize the current of the LED load, control a size of the current of the LED load, and the like.

In the lighting circuit of the present disclosure, if the turn-on angle detection circuit U01 detects that the turn-on angle of the triac dimmer is greater than the first angle, before the LED load is loaded and when the sampling voltage VCS is greater than or equal to a first threshold, in other words, in a turn-on stage of the LED load, in which the current of the LED load is greater than or equal to the threshold current, the bleeder circuit U02 keeps on till the load current drops to the threshold current. If the turn-on angle detection circuit U01 detects that the turn-on angle of the triac dimmer is less than or equal to the first angle, the bleeder circuit can be turned off after first time after the triac dimmer is turned on. Specifically, when the turn-on angle is less than or equal to the first angle, and turn-on time of the triac dimmer reaches the first time greater than 0, if the current of the LED load is greater than or equal to the threshold current, the bleeder circuit keeps on, and the bleeder circuit is turned off when the current of the LED load is less than the threshold current. If the current of the LED load is less than the threshold current, the bleeder circuit is immediately turned off. In this way, regardless of whether the current of the LED load reaches the holding current, when the LED load is turned on, the sum of the load current and the bleed-off current is enough to keep the triac dimmer on, and a significant loss caused by unnecessary long-time turn-on of the bleeder circuit can be avoided.

The turn-on angle detection circuit in the present disclosure can detect the bus voltage to detect a size of the turn-on angle of the triac dimmer. Whether the bus voltage increases or decreases over time within given time is detected. When it is detected that the bus voltage increases over the time, it indicates that the turn-on angle of the triac dimmer is greater than the first angle. When it is detected that the bus voltage decreases over the time, it indicates that the turn-on angle of the triac dimmer is less than or equal to the first angle. In a case that the lighting circuit powers down in each half wave cycle, it is not possible to store information from time when the turn-on of the triac dimmer is cut off to time when the triac dimmer is turned on again. Therefore, a change trend of the bus voltage within the given time is detected in each half wave cycle, which is convenient to obtain a relationship between the turn-on angle of the triac dimmer and a 90-degree turn-on angle.

The present disclosure distinguishes the turn-on angle of the triac dimmer, which can avoid the significant loss caused by unnecessary constant turn-on of the bleeder circuit when the turn-on angle of the triac dimmer is small, and can improve working efficiency of a lighting system. When the turn-on angle is less than 90 degrees, the present disclosure can further improve compatibility of the triac dimmer when the turn-on angle is small, and optimize a problem of large and small waves.

Figure 3:
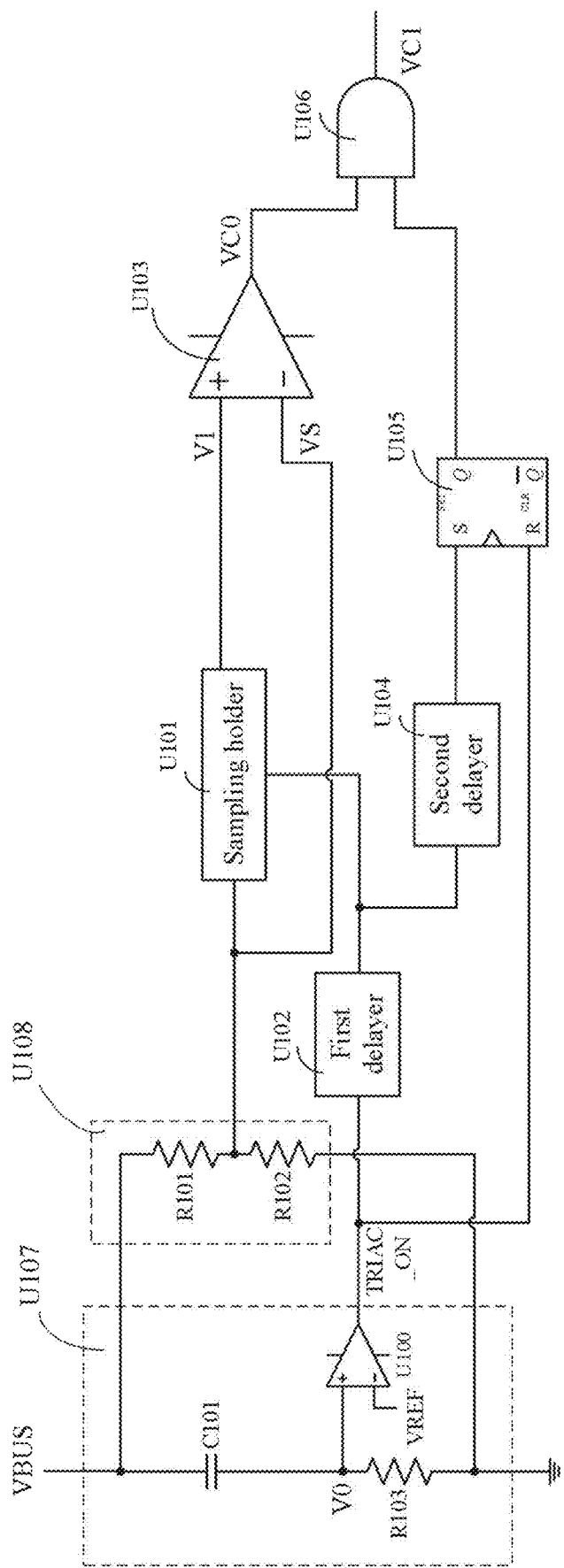
FIG. 3 is a schematic diagram of a turn-on angle detection circuit of a lighting circuit according to the present disclosure.
Figure 4A:
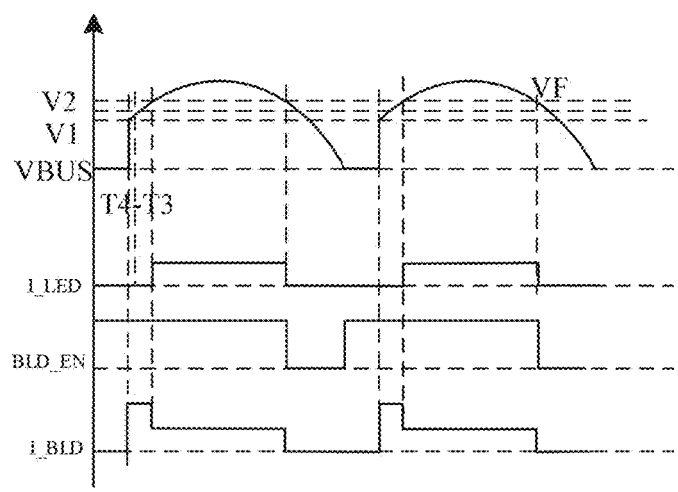
FIGS. 4A-4C show a signal waveform diagram of a lighting circuit under different turn-on angles according to the present disclosure.
Figure 4B:
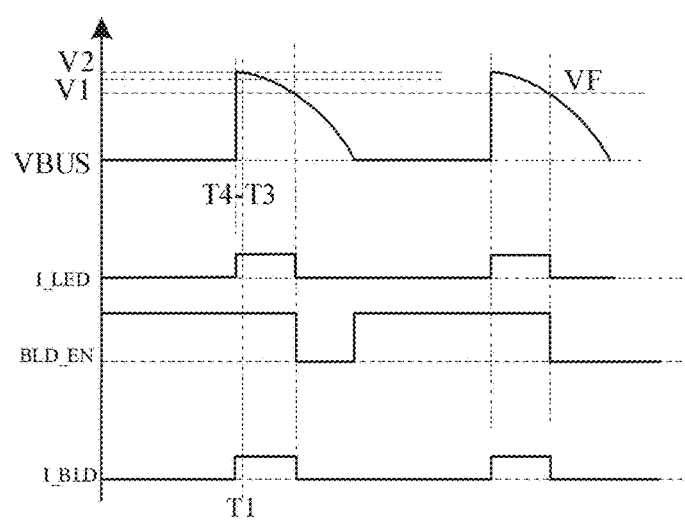
Figure 4C:
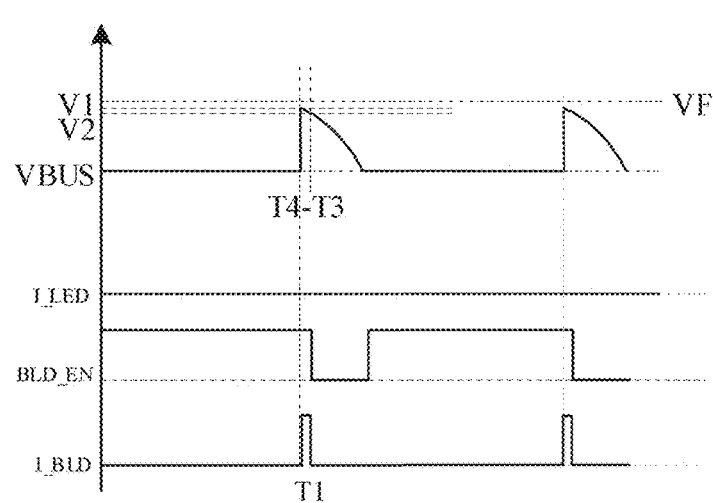

FIG. 3 is a schematic diagram of the turn-on angle detection circuit according to the present disclosure. The turn-on angle detection circuit includes a turn-on detection circuit U107 and a voltage detection circuit U108. The turn-on detection circuit U107 is configured to detect whether the triac dimmer is turned on, and includes first capacitor C101, first resistor R103, and second comparator U100. The first capacitor C101 and the first resistor R103 are connected in series to form a series circuit. A first terminal of the series circuit is connected to the bus, and a second terminal of the series circuit is grounded. For the second comparator U100, a first input terminal is configured to receive voltage V0 of a terminal connecting the first capacitor C101 and the first resistor R103, and a second terminal is configured to receive reference voltage VREF, and an output terminal is configured to output a comparison signal representing whether the triac dimmer is turned on. After the triac dimmer is turned on, a voltage signal appears on the bus, and the bus voltage VBUS is applied to the series circuit. When the voltage V0 of the terminal connecting the first capacitor C101 and the first resistor R103 is greater than the reference voltage VREF, it indicates that the triac dimmer is turned on. The voltage detection circuit U108 includes voltage divider resistors R101 and R102 that are connected in series. A first end of a series circuit formed by connecting the voltage divider resistors R101 and R102 is connected to the bus, and a second terminal of the series circuit is grounded. A terminal connecting the voltage divider resistors R101 and R102 is configured to output sampling signal V2 of the bus voltage. The turn-on angle detection circuit further includes sampling holder U101, first delayer U102, second delayer U104, comparator U103, trigger U105, and AND gate circuit U106. The first delayer U102 is configured to control, after a signal indicating that the triac dimmer is turned on is detected, the sampling holder U101 to sample and hold voltage VS after turn-on time of the triac dimmer reaches third time T3, to obtain first voltage V1 after the sampling and holding. When the third time T3 is 0, it means that the bus voltage VBUS is sampled and held to obtain the first voltage V1 when the triac dimmer is turned on. The comparator U103 is configured to compare sampling signal VS of the bus voltage with the first voltage V1 and outputs comparison signal VC0. After the first delayer U102 delays the third time T3, the second delayer U104 delays a period of time to control the trigger U105 to reset. After the second delayer U104 delays a total of fourth time T4, if the first voltage V1 is greater than the sampling signal VS, the comparison signal VC0 is a high-level signal, and the AND gate circuit U106 also outputs a high-level signal, which indicates that the bus voltage is decreasing. This further indicates that the turn-on angle of the triac dimmer is less than or equal to 90 degrees, as shown in FIGS. 4A-4C. If the first voltage V1 is less than the sampling signal VS, the comparison signal VC0 is a low-level signal, and the AND gate circuit U106 also outputs a low-level signal, which indicates that the bus voltage is increasing. This further indicates that the triac dimmer has the turn-on angle that is greater than 90 degrees, as shown in FIGS. 4A-4C. This embodiment can determine a range of the turn-on angle, and turn-off of the bleeder circuit can be controlled without detecting a specific size of the turn-on angle.

FIGS. 4A-4C show a signal waveform diagram of the lighting circuit under different turn-on angles. This waveform diagram assumes that the load current when the LED load is turned on is not enough to keep the triac dimmer on, and the bleed-off current needs to be further generated. After the triac dimmer is turned on for a period of time T3, the bus voltage is V1. After a period of time (T4–T3), the bus voltage is V2. If the bus voltage VBUS increases from the V1 to the V2, as shown in FIG. 4A, it indicates that the turn-on angle of the triac dimmer is greater than 90 degrees. If the bus voltage VBUS decreases from the V1 to the V2, as shown in FIG. 4B and FIG. 4C, it indicates that the turn-on angle of the triac dimmer is less than 90 degrees. When the triac dimmer is just turned on, change rate dv/dt of the bus voltage at a moment of the turn-on is relatively large, which can easily be misjudged as a large turn-on angle. Therefore, a change trend of the bus voltage is observed after the time T3 after the triac dimmer is turned on. As shown in FIG. 4A, the turn-on angle of the triac dimmer is greater than 90 degrees. When the bus voltage VBUS is less than or equal to voltage drop VF of the LED load, the LED load is cut off and there is no current in the LED load. In FIG. 4A, a waveform of the current I_LED of the LED load is at a low level, and enabling signal BLD_EN of the bleeder circuit is maintained at a high level. The bleeder circuit generates large bleed-off current I_BLD from time when the triac dimmer is turned on to before the LED load is turned on to keep the triac dimmer on. When the bus voltage VBUS is greater than the voltage drop VF of the LED load, the LED load is turned on, and the waveform of the current I_LED of the LED load is at the high level. However, the current I_LED of the LED load is too small to keep the triac dimmer on. Therefore, in the turn-on stage of the LED load, the bleeder circuit is still on and generates small bleed-off current I_BLD. A sum of the bleed-off current I_BLD and the current I_LED of the LED load continues to keep the triac dimmer on. When the turn-on of the LED load is cut off, the enabling signal BLD_EN is at the low level, the bleeder circuit is turned off without generating the bleed-off current I_BLD, and a waveform of the bleed-off current I_BLD and the waveform of the current of the LED load are at the low level. When the bus voltage VBUS drops to a second threshold that is set to near a zero voltage in the legend, the enabling signal BLD_EN of the bleeder circuit flips to the high level.

As shown in FIG. 4B, the turn-on angle of the triac dimmer is less than 90 degrees and close to 90 degrees. When the triac dimmer keeps on for the first time T1 that starts from time when the triac dimmer is detected, if it is detected that the current of the LED load is greater than or equal to the threshold current, the enabling signal BLD_EN of the bleeder circuit maintains at the high level, and the bleeder circuit is controlled to be on until the turn-on of the LED load is cut off and the current of the LED load is less than the threshold current. The sum of the bleed-off current I_BLD and the current I_LED of the LED load continues to keep the triac dimmer on. When the turn-on of the LED load is cut off, the enabling signal BLD_EN of the bleeder circuit is at the low level, and the bleeder circuit is cut off, without generating the bleed-off current I_BLD. The waveform of the bleed-off current I_BLD and the waveform of the current of the LED load are at the low level. When the bus voltage VBUS drops to the second threshold, the BLD_EN of the bleeder circuit flips to the high level to control the bleeder circuit to turn on again.

As shown in FIG. 4C, the turn-on angle of the triac dimmer is much less than 90 degrees, the bus voltage is always less than the voltage drop VF of the LED load, the LED load is always cut off, and the enabling signal BLD_EN of the bleeder circuit maintains at the high level. When it is detected that the load current is less than the threshold current after the first time T1 after the triac dimmer is turned on, the enabling signal BLD_EN flips to the low level, and the bleeder circuit is controlled to turn off immediately. The bleed-off current I_BLD is generated only within first time from the time when the triac dimmer is turned on to time when the enabling signal BLD_EN flips to the low level (the bleeder circuit is turned off). When the bus voltage VBUS drops to the second threshold, the enabling signal BLD_EN is at the high level again to control the bleeder circuit to turn on.

Referring to FIGS. 4A-4C, without considering whether the current of the LED load reaches the holding current of the triac dimmer, when the turn-on angle of the triac dimmer is greater than 90 degrees, after the triac dimmer is turned on and before the current of the LED load crosses 0, the enabling signal BLD_EN of the bleeder circuit is always at the high level to keep the bleeder circuit turned on. Therefore, when the load current is greater than the holding current, the bleeder circuit generates a small bleed-off current close to 0 during the turn-on of the LED load. When the load current is less than the holding current, the bleeder circuit generates a large bleed-off current during the turn-on of the LED load, such that the sum of the bleed-off current and the load current reaches the holding current to keep the triac dimmer on. When the turn-on angle of the triac dimmer is less than or equal to 90 degrees, if it is detected that the current of the LED load is greater than or equal to the threshold current after the first time after the triac dimmer is turned on, the enabling signal BLD_EN maintains at the high until the current of the LED load is less than the threshold current. If it is detected that the current of the LED load is less than the threshold current after the first time after the triac dimmer is turned on, it indicates that the LED load is not turned on and will be no longer turned on afterwards. In this case, the enabling signal BLD_EN of the bleeder circuit flips to the low level, and the bleeder circuit is turned off immediately.

The present disclosure optimizes operation of the bleeder circuit and controls corresponding turn-off time of the bleeder circuit under different conditions, thereby avoiding the significant loss caused by the unnecessary long-time turn-on of the bleeder circuit. Optimizing the operation of the bleeder circuit can also improve the compatibility of the triac dimmer when the turn-on angle is small, and optimize the problem of large and small waves.

Although the embodiments are separately illustrated and described above, the embodiments contain some common technologies. Those skilled in the art can replace and integrate the embodiments. Any content not clearly recorded in one of the embodiments may be determined based on another embodiment where the content is recorded.

The implementations described above do not constitute a limitation on the protection scope of the technical solutions of the present disclosure. Any modification, equivalent replacement, and improvement made without departing from the spirit and principle of the above implementations should fall within the protection scope of the technical solutions of the present disclosure.

What is claimed is:

1. A lighting circuit, comprising a triac dimmer and a rectifier circuit, wherein the triac dimmer is connected between an alternating current (AC) input power supply and the rectifier circuit, the rectifier circuit is configured to output a bus voltage after phase cutting, and the lighting circuit further comprises:

a turn-on angle detection circuit configured to detect a turn-on state of the triac dimmer, and output a first detection signal, wherein the first detection signal represents a relationship between a turn-on angle of the triac dimmer and a first angle; and a bleeder circuit connected to the rectifier circuit and configured to receive a sampling signal representing a current of a light-emitting diode (LED) load and the first detection signal, and control a turn-on state of the bleeder circuit based on the first detection signal and the sampling signal; wherein when the first detection signal represents that the turn-on angle is less than or equal to the first angle, and turn-on time of the triac dimmer reaches first time, when the sampling signal is greater than or equal to a first threshold, the bleeder circuit keeps on; or when the sampling signal is less than the first threshold, the bleeder circuit is turned off.

2. The lighting circuit according to claim 1, wherein when the first detection signal represents that the turn-on angle is greater than the first angle, before the LED load is turned on and during turn-on of the LED load, the bleeder circuit keeps on, and the bleeder circuit is turned off when the sampling signal drops to the first threshold.

3. The lighting circuit according to claim 1, wherein the turn-on angle detection circuit is configured to detect the bus voltage, wherein when the detected bus voltage increases within specified time, the first detection signal represents that the turn-on angle is greater than the first angle; or when the detected bus voltage decreases within the specified time, the first detection signal represents that the turn-on angle is less than or equal to the first angle.

4. The lighting circuit according to claim 1, wherein the first angle is set to be equal to or close to 90°.

5. The lighting circuit according to claim 1, wherein the first time is set to be time greater than 0.

6. The lighting circuit according to claim 1, wherein when the bus voltage is less than a second threshold, the bleeder circuit is turned on.

7. The lighting circuit according to claim 1, wherein when the bus voltage is less than a second threshold, the bleeder circuit is turned on after delaying second time.

8. The lighting circuit according to claim 1, wherein the turn-on angle detection circuit comprises:

a turn-on detection circuit connected to a bus and configured to output a signal representing that the triac dimmer is turned on;

a voltage detection circuit connected to the turn-on detection circuit and configured to detect the bus voltage to obtain a voltage detection signal after the triac dimmer is turned on;

a sampling holder configured to: after turn-on time of the triac dimmer reaches third time, sample and hold the voltage detection signal, and output a voltage holding signal; and a first comparator configured to: after turn-on time of the triac dimmer reaches fourth time, compare the voltage detection signal and the voltage holding signal, and output a first comparison signal, wherein when the voltage detection signal is greater than the voltage holding signal, the first comparison signal represents that the turn-on angle is greater than the first angle; or when the voltage detection signal is less than the voltage holding signal, the first comparison signal represents that the turn-on angle is less than or equal to the first angle.

9. The lighting circuit according to claim 8, wherein the turn-on detection circuit comprises a first capacitor, a first resistor, and a second comparator;

the first capacitor and the first resistor are connected in series to form a series circuit, wherein a first terminal of the series circuit is configured to receive the bus voltage, and a second terminal of the series circuit is grounded; and the second comparator comprises a first input terminal connected to a common connection terminal of the first capacitor and the first resistor, and a second input terminal configured to receive a reference voltage, wherein when a voltage of the common connection terminal of the first capacitor and the first resistor is greater than or equal to the reference voltage, the second comparator outputs a second comparison signal representing that the triac dimmer is turned on.

10. The lighting circuit according to claim 1, wherein the bleeder circuit comprises a first switching transistor and a bleeder resistor that are connected in series form a series circuit, and the series circuit is in parallel connection with the rectifier circuit, wherein when the first switching transistor is turned on, the bleeder circuit is turned on.

11. The lighting circuit according to claim 1, further comprising a LED control circuit connected to the LED load and configured to control a working state of the LED load.

12. A control method of a lighting circuit, wherein the lighting circuit comprises a triac dimmer and a rectifier circuit, the triac dimmer is connected between an AC input power supply and the rectifier circuit, the rectifier circuit is configured to output a bus voltage after phase cutting, and the control method comprises:

detecting a turn-on state of the triac dimmer, and obtaining a first detection signal, wherein the first detection signal represents a relationship between a turn-on angle of the triac dimmer and a first angle; and controlling a turn-on state of a bleeder circuit based on the first detection signal and a sampling signal representing a current of an LED load, wherein the bleeder circuit is connected in parallel to an output terminal of the rectifier circuit, wherein when the first detection signal represents that the turn-on angle is less than or equal to the first angle, and turn-on time of the triac dimmer reaches first time, when the sampling signal is greater than or equal to a first threshold, the bleeder circuit keeps on; or when the sampling signal is less than the first threshold, the bleeder circuit is turned off; or when the first detection signal represents that the turn-on angle is greater than the first angle, before the LED load is turned on and during turn-on of the LED load, the bleeder circuit keeps on, and the bleeder circuit is turned off when the sampling signal drops to the first threshold.

13. The control method of the lighting circuit according to claim 12, wherein the control method comprises: detecting the bus voltage; and when the detected bus voltage increases within specified time, indicating that the turn-on angle is greater than the first angle; or when the detected bus voltage decreases within the specified time, indicating that the turn-on angle is less than or equal to the first angle.

14. The control method of the lighting circuit according to claim 12, wherein the first angle is set to be equal to or close to 90°.

15. The control method of the lighting circuit according to claim 13, wherein the first time is set to be time greater than 0.

* * * * *